United States Patent
Engel et al.

(10) Patent No.: US 9,911,225 B2
(45) Date of Patent: Mar. 6, 2018

(54) LIVE CAPTURING OF LIGHT MAP IMAGE SEQUENCES FOR IMAGE-BASED LIGHTING OF MEDICAL DATA

(71) Applicant: Siemens Healthcare GmbH, Erlangen (DE)

(72) Inventors: Klaus Engel, Nuremberg (DE); Daphne Yu, Yardley, PA (US); Gianluca Paladini, Skillman, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 310 days.

(21) Appl. No.: 14/869,042

(22) Filed: Sep. 29, 2015

(65) Prior Publication Data
US 2017/0091982 A1    Mar. 30, 2017

(51) Int. Cl.
*G06T 15/08* (2011.01)
*H04N 5/225* (2006.01)

(52) U.S. Cl.
CPC .......... *G06T 15/08* (2013.01); *H04N 5/2256* (2013.01)

(58) Field of Classification Search
CPC ...................................................... G06T 15/08
See application file for complete search history.

(56) References Cited

U.S. PATENT DOCUMENTS

| | | | |
|---|---|---|---|
| 7,256,780 B2 | 8/2007 | Williams et al. | |
| 8,184,119 B2 | 5/2012 | Desgranges et al. | |
| 9,001,124 B2 | 4/2015 | Engel | |
| 2002/0038118 A1* | 3/2002 | Shoham | A61B 17/1757 606/1 |
| 2008/0058629 A1* | 3/2008 | Seibel | A61B 1/0008 600/368 |
| 2008/0221388 A1* | 9/2008 | Seibel | A61B 1/0008 600/109 |
| 2009/0082660 A1* | 3/2009 | Rahn | A61B 6/12 600/411 |
| 2010/0114289 A1* | 5/2010 | Camus | A61F 2/95 623/1.11 |
| 2013/0197354 A1* | 8/2013 | Maschke | A61B 6/487 600/424 |
| 2014/0092281 A1 | 4/2014 | Nisenzon et al. | |
| 2015/0313503 A1* | 11/2015 | Seibel | A61B 1/00165 600/103 |
| 2016/0343161 A1* | 11/2016 | Paladini | G06T 15/08 |
| 2017/0061681 A1* | 3/2017 | Engel | G06T 15/506 |

* cited by examiner

*Primary Examiner* — James Pontius

(57) ABSTRACT

Methods, apparatuses, and systems are provided for live capturing of light map image sequences for image-based lighting of medical data. Patient volume scan data for a target area is received over time by a processor. Lighting environment data for the target area is captured over time by a camera. The camera transmits the lighting environment data to the processor over time. The processor lights the patient volume scan data with the lighting environment data into lighted volume data over time. The processor renders an image of the lighted volume data over time.

20 Claims, 2 Drawing Sheets

US 9,911,225 B2

LIVE CAPTURING OF LIGHT MAP IMAGE SEQUENCES FOR IMAGE-BASED LIGHTING OF MEDICAL DATA

BACKGROUND

The present embodiments relate to lighting for rendering from medical data. As part of many medical procedures, a system scans a patient, and then the resulting data is used to visualize a representation of the patient. Up until now the visualization process included using artificial created lighting effects. The artificial lighting effects are employed to help with depth and shape perception. This process is used for preoperative planning, diagnosing of patients, and intraoperative actions. Lighting effects are important to help the doctor know what it is that they are viewing, so that the doctor does not make unnecessary mistakes based off of incomplete data.

BRIEF SUMMARY

By way of introduction, the preferred embodiments described below include methods, systems, instructions, and non-transitory computer readable media for live capturing of light map image sequences for image-based lighting of medical data. The actual lighting conditions in an operating room, or other environment, are captured by use of specialized cameras, such as spherical panorama cameras. The captured lighting conditions are then used with patient scan data to create patient data that has a natural look where the anatomy shown (interior organs) appear as if revealed in the real world or exterior environment. This photo-realistic visualization result may be super-imposed on the patient using augmented reality techniques (e.g. augmented reality glasses) to blend the real and virtual worlds. The effect is especially pronounced when light field rendering methods, depth capturing, registration, and tracking of the viewer position are employed. The boundaries between the real and virtual world may be removed (i.e., the user may move around the patient while the scanned inner anatomy stays naturally fused with the patient). A user may focus and defocus the eyes on a specific virtual anatomical structure the same way as in the real world.

In a first aspect, a method is provided for light map capture. A patient volume scan data for a target area is received by a processor. A camera captures lighting environment data that intersects an exterior surface on a patient for the target area. The camera transmits the lighting environment data to the processor. The processor lights the patient volume scan data with the lighting environment data the lighting providing a lighted patient volume data. The processor renders the lighted patient volume data.

In a second aspect, a system is provided for light map capture. The system includes a processor and at least one camera. The processor is configured to receive over time patient scan data for a target area. The camera is configured to over time capture lighting environment data that intersects an exterior surface on a patient for the target area. The at least one camera is configured to further transmit over time the lighting environment data. The processor is further configured to receive over time the lighting environment data. The processor is configured to light over time the received lighting environment data and the patient scan data into lighted volume data. The processor is further configured to render images over time using the lighted volume data.

In a third aspect, a non-transitory computer readable storage medium has stored therein data representing instructions executable by a programmed processor for facilitating light map capture. The instructions include receiving over time scan data for a target area internal to a patient. The processor, according to the instructions, receives over time lighting environment data for the target area as projected to an exterior of the patient. The processor, according to the instructions, renders an image of the target area from the scan data, the rendering including a lighting model based on the lighting environment data for the target area as projected to the exterior of the patient, and displays the image.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Accurately lighting patient data for photo-realistic rendering of medical volume data is problematic, because it requires capturing changing lighting conditions in the environment where a medical procedure may be performed. These problems may be solved by capturing the actual lighting environment in an area where a patient is to be operated on, examined, or diagnosed. The actual lighting environment may be captured by using specialized cameras, such as spherical panorama cameras, that capture light effects in 360 degrees or over other ranges.

Figure 1:
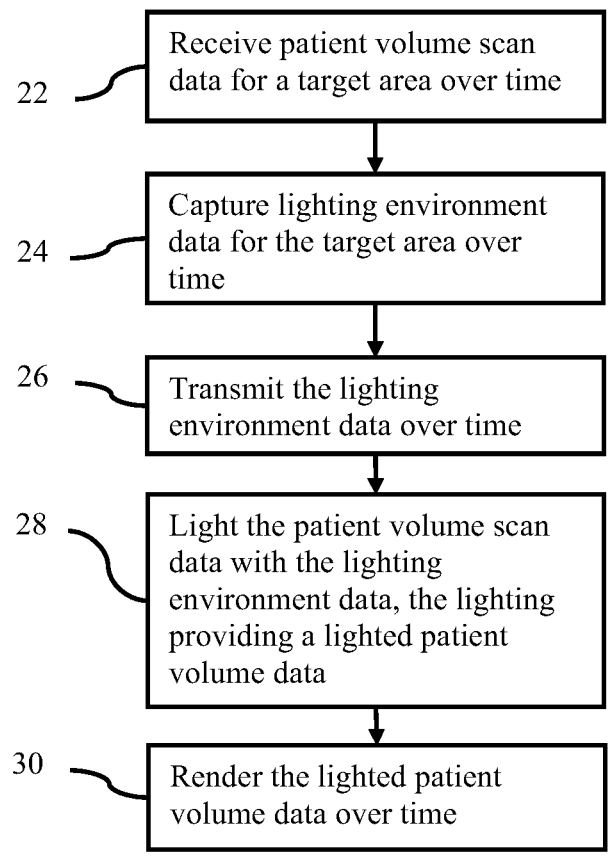
FIG. 1 is a flow chart diagram for capturing light map data for lighting in rendering of medical data.

FIG. 1 is a flow chart diagram of one embodiment of a method for light map capture. The method is implemented by the system of FIG. 2, at least one camera, a processor, a memory, or another system. For example, at least one camera captures a light map surrounding a patient, and the processor and memory utilize the captured light map to construct a realistic visualization of an area of the patient.

The method may be used as part of surgery planning, surgery assistance, post-surgery analysis, or diagnostic purposes. In alternative embodiments, the method may be used as part of visualizing the interior components, or space, of any object in the real world for accurate visual depiction in a virtual or augmented reality. Rendering an image of an internal object with light captured from external to the object may be used for visualization without augmented reality.

The acts are performed in the order shown (e.g., top to bottom) or other orders. Additional, different, or fewer acts may be provided. For example, the method is performed without rendering the lighted patient volume scan data in act 30. As another example, act 22 is not performed and instead patient volume scan data is retrieved from memory, such as the memory 16 in FIG. 2.

In act 22, patient volume scan data for a target area is received. The patient is scanned or imaged to acquire the volume scan data. In alternative embodiments, the patient volume scan data is retrieved from memory. The receiving may be performed by the processor 14 of the system depicted in FIG. 2.

The patient volume scan data may be a plurality of fluoroscopic images. The patient volume scan data may be interventional scan data, preoperative scan data, postoperative scan data, or intraoperative scan data. The scan data represents a volume, such as a three-dimensional region. Voxels in a Cartesian grid (e.g., N×M×O where N, M, and O are integers greater than 1) are acquired. Other grids may be used. The scan data is reconstructed and/or interpolated to the grid or into a volume format. In other embodiments, the scan data represents the volume in a scan format.

The target area may correspond to an anatomical region of a patient. For example, the target area may be a region surrounding or including the patient's lungs, or heart. Similarly, the target area may change as the acts of the method are performed in response to rendering and visualization of data. In some embodiments, for example, the patient volume scan data is received over the duration of an entire medical procedure, such as open heart surgery or an interventional procedure, such as an angiography. In some embodiments the receiving is done continuously over time for the operation of the method depicted in FIG. 1.

In act 24, lighting environment data representing light that intersects an exterior surface on a patient for the target area is captured over time. The capturing may be done by the camera 12 of the system depicted in FIG. 2. In some embodiments the camera captures the lighting environment data using instructions stored in the memory 16 of the system depicted in FIG. 2. The lighting environment data may include all light incident to the target area. For example, the lighting environment data includes all rays of light that intersect with the target area, such as an external surface of the patient that corresponds with an internal location of the target area in the patient. Light on the exterior of the patient projected from the interior (i.e., light on the target area) may be from the ambient light that exists in a location that a procedure is taking place, as well as directed lighting sources that are under the control of medical staff performing the procedure. The result is that the lighting environment data may represent all light that would be incident to a target area inside the patient, such as a lung or heart, if the target area was in effect "outside" or on the surface of the patient. In some embodiments a plurality of cameras are used to ensure that all light incident to the target area is captured.

Figure 2:
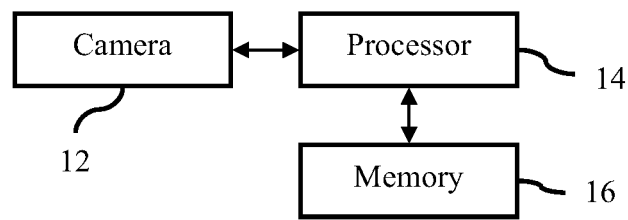
FIG. 2 illustrates an example system for capturing light map data for lighting in rendering of medical data.

The camera may be affixed to another part of the system in FIG. 2. For example, in some embodiments the camera is affixed to a C-arm system that is capable of rotating around a patient. Alternatively, the camera is affixed to a wall, ceiling, floor, other device, or to a person.

The lighting environment data includes the effects of people or objects in the environment. The map is a sampling of locations of the target area. The light at different locations on the patient is captured, providing a light map. The people or objects in the room may affect the light on the patient. For example, in some embodiments, the lighting environment inside of an operating room is captured. The position of an operating surgeon, the location of any necessary medical equipment for the operation, and the position of any support staff in the operating room may all impact the rays of light that are incident with the target area. By taking into account the ambient light environment (e.g. any light that is generated from a light source, and any light that is generated or supplied in an environment that is not generated directly from a light source), and the impact of all objects in the light environment on light rays when capturing the lighting environment data, the target area may be realistically rendered and visualized. Similarly, as a person in the location where the light is being captured moves around the location this may impact the lighting environment data, because a change in position of the person may cast a different shadow over the target area. In this way, the light on the target and due to any shadows cast by objects or people as they move about the environment during a medical procedure is captured. In some embodiments, the capturing is done continuously over time.

In act 26, the camera transmits the lighting environment data. The transmitting may be done by the camera 12 of the system depicted in FIG. 2. The transmitting may include streaming the lighting environment data to the processor 14 of the system in FIG. 2. Additionally, the transmission may be over a bus, such as an internal bus or an external bus, transmitting data between components, or using memory for access by the processor. The lighting environment data is transmitted in a steady and continuous or periodic manner for an extended period of time, such as the duration of an operation. In some embodiments, the transmitting is done continuously over time. Alternatively, the lighting environment data is captured once and transmitted initially for use over a period.

In act 28, the processor applies light effects from the lighting model to the patient volume scan data by using the lighting environment data. The application results in a set of data, a lighted patient volume dataset, to be used for rendering. The processor may modify the patient volume scan data with the lighting environment data to change the lighting values of the patient volume scan data. The lighted volume data includes global illumination effects such as ambient occlusion, shadows, and translucency. The inclusion of such lighting effects produces photorealistic imagery. In some embodiments, the combining is done continuously over time. As scan data and/or lighting environment data changes, the combination changes. Alternatively, the combination is performed for a single image.

In act 30, a graphics rendering processor renders an image from the lighted patient volume data. For example, the processor 14 of the system depicted in FIG. 2 renders using the lighted volume data. The rendering may be done using a Monte-Carlo path tracing algorithm. The Monte-Carlo path tracing algorithm includes calculating all light that arrives at a single point, in this case a pixel in the rendered image, by integrating in a probabilistic way the light which passes directly or indirectly through voxels in the lighted volume data and arrives at such pixel. The process is repeated for all pixels in the rendered image plane, which represents a viewpoint camera focused on the target area. In some embodiments the particular Monte-Carlo path tracing algorithm disclosed in PCT/EP2014/070231, which is hereby incorporated by reference in its entirety, may be modified and be employed for rendering the lighted volume data. The aforementioned disclosure uses a cinematic volume rendering approach that creates estimates of the incoming light to the virtual detector pixels inside a virtual camera. Many of these estimates are averaged to create an image presented to the user. As new estimates are computed, the quality of the image improves over time (i.e., the image progressively becomes less noisy) meaning the amount of extraneous data is eliminated. By using Monte-Carlo path tracing, cinematic volume rendering samples arbitrary light paths through the volume, capturing complex lighting effects and sophisticated camera models. The aforementioned may, for example, be modified to replace the incoming light with the captured light and the virtual camera with the position of an observer. The modifications may allow for the rendering in real-time (e.g. meaning events are simulated at the same speed that they would occur in real life) the lighting effects on volumes. For example, a surgeon may be able to see what an organ may look like inside of a patient before beginning the surgery by using preoperative scan data and the captured light environment data corresponding to the ambient light in the operating room. Other rendering may be used, such as ray casting, projection, or surface. The rendering uses lighting modeled on the captured light external to the patient so that the internal region is visualized with ambient or other lighting from external to the patient. The lighting model uses just the captured light or models the captured light and one or more other virtual lighting sources.

In some embodiments, the rendered image may be sent to a visualization device. The processor 14 of the system in FIG. 2 may send the rendered image. In other embodiments, the rendering is performed at the visualization device. The visualization device may be a medical workstation, such as a terminal accessible by a doctor during a procedure. Similarly, the visualization device may be augmented reality glasses. A doctor may equip and use the augmented reality glasses to visualize the rendered image during a medical procedure. In some embodiments, the rendered lighted volume data is transmitted to a combination of visualization devices, such as a workstation and augment reality glasses.

In other embodiments the target area may move in relation to the position of the visualization device. For example, a doctor may be wearing augmented reality glasses during an operation and as the doctor's head moves, the augmented reality glasses may move accordingly. As such, the target area for the patient scan data may change to keep in sync (e.g. aligned with the field of vision of the doctor) with the view of the augmented reality glasses. By staying in sync with the field of vision of the augmented reality glasses, a doctor is allowed to view the patient's anatomy as the patient's anatomy would appear if the doctor was performing a surgical procedure on the patient.

Figure 3:
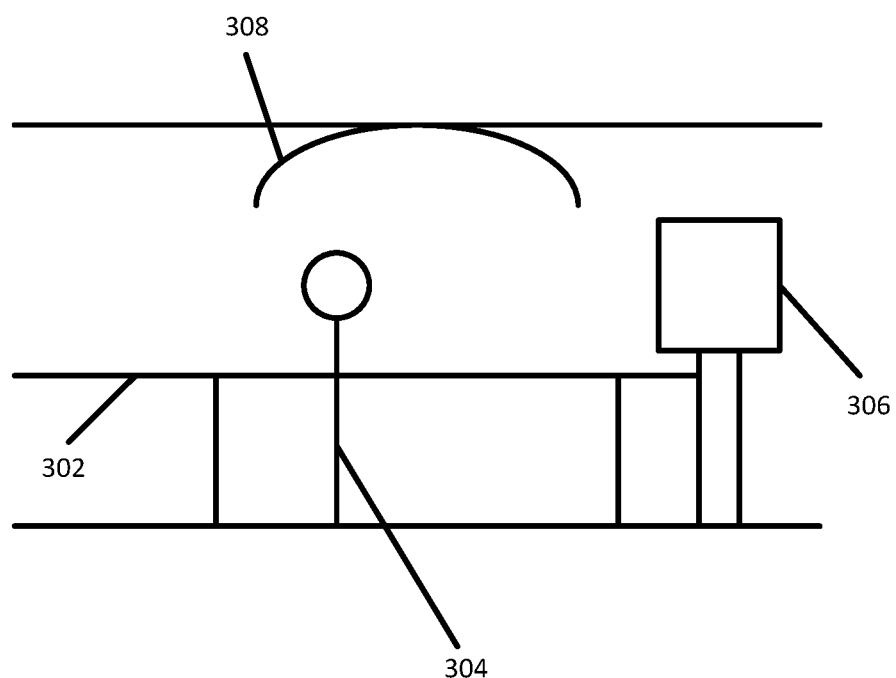
FIG. 3 is an example operating room that may use the system for capturing light map data for lighting in rendering of medical data.

FIG. 3 shows an example operating room that may use the system for capturing light map data for lighting medical data. FIG. 3 includes an operating table 302, a camera 304, a workstation 306, and a lighting arrangement 308. The operating table 302 may be used as part of a procedure on a patient. In some embodiments the operating table 302 may have a C-arm affixed to it. The camera 304 may be used to capture the light map data in the operating room to be used in the visualization of the patient data. The workstation 306 may be the system depicted in FIG. 2. The lighting arrangement 308 may be a set of lights that are installed in the operating room, which may impact the lighting conditions in the operating room. The effect of the light arrangement as well as the effect of the workstation 306, operating table 302 may all be captured by the camera 304.

FIG. 2 shows a system for capturing light map data for lighting medical data of a patient. The system includes a camera 12, a memory 16, and a processor 14. In some embodiments a display is attached to the system. Additional, different, or fewer components may be provided. For example, a network or network connection is provided, such as for networking from the camera 12 to a remote computer or server. In another example, a user interface is provided.

The processor 14 and memory 16, and/or camera 12 are part of a medical imaging system. Alternatively, the processor 14, memory 16, and/or camera 12 are part of a server, computer, and/or image processing system separate from the system depicted in FIG. 2. In other embodiments, the processor 14, memory 16, and a display are a personal computer, such as desktop or laptop, a workstation, a server, a network, or combinations thereof. The processor 14, display, and memory 16 may be provided without other components for capturing light map data for lighting medical data.

The camera 12 may be a high dynamic range spherical panorama movie camera (HDR camera). Multiple HDR cameras may be used in conjunction. The HDR cameras may be attached to a gantry of a medical device, such as a patient bed, floor stands, or ceiling mounts. The HDR cameras are positioned in close proximity of the target area to be captured. Instead of attaching to fixed mounts, the HDR cameras may also be freely moveable or quickly attachable to a number of mount points. Each HDR camera captures live images or a live movie (e.g. a continuous transmission of data representing the visual events as they occur) of the dynamic lighting conditions and sends the image stream to a visualization device that renders three dimensional patient data. The lighting information of the HDR camera closest to the anatomy or interpolated lighting information from multiple cameras may be employed.

The memory 16 may be a graphics processing memory, a video random access memory, a random access memory, system memory, cache memory, hard drive, optical media, magnetic media, flash drive, buffer, database, combinations thereof, or other now known or later developed memory device for storing data. The memory 16 is part of the system depicted in FIG. 2, part of a computer associated with the processor 14, part of a database, part of another system, or a standalone device.

The memory 16 stores image data, such as fluoroscopic image data of a patient. The fluoroscopic image data represents a plurality of planes and/or a volume. The memory 16 may alternatively or additionally store data during processing, such as lighting effects, light ray paths, possible object locations, extracted feature values, actual object locations, imaging data, and/or other information discussed herein.

The memory 16 or other memory is alternatively or additionally a non-transitory computer readable storage medium storing data representing instructions executable by the programmed processor 14 for capturing and/or using light map data for lighting medical data. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 14 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for lighting for rendering from medical data. The processor 14 is a single device or multiple devices operating in serial, parallel, or separately. The processor 14 may be a main processor of a computer, such as a laptop or desktop computer, or may be a processor for handling some tasks in a larger system, such as in an imaging system. The processor 14 is configured by instructions, design, hardware, and/or software to perform the acts discussed herein. The processor 14 is configured to perform the acts discussed above. The processor 14 may be configured to generate a user interface for receiving corrections or verification of the detecting and tracking of objects.

The system depicted in FIG. 2 may also include a display. The display may be a monitor, LCD, projector, plasma display, CRT, printer, or other now known or later developed devise for outputting visual information. The display receives images, graphics, text, quantities, or other information from the processor 14, memory 16, or camera 12. One or more images are displayed. The images are of a targeted area within patient data, or any other anatomical data, or volume data, which have been lighted with the present lighting environment which includes the ambient light in an area where the targeted area is located. The images may be streamed during a procedure, or the images may be still images.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for light map capture, the method comprising:
receiving over time, by a processor, patient volume scan data for a target area;
capturing over time, by at least one camera, lighting environment data that intersects an exterior surface on a patient for the target area;
transmitting over time, by the at least one camera, the lighting environment data to the processor;
lighting over time, by the processor, the patient volume scan data with the lighting environment data, the lighting providing a lighted patient volume data; and
rendering over time, by the processor, an image from the lighted patient volume data.

2. The method of claim 1, wherein the patient volume scan data includes a plurality of fluoroscopic images.

3. The method of claim 1, wherein the patient volume scan data is preoperative scan data, postoperative scan data, or intraoperative scan data.

4. The method of claim 1, wherein the lighting environment data includes all light that intersects an exterior surface on a patient for the target area.

5. The method of claim 1, wherein rendering the lighted patient volume scan data includes using a Monte-Carlo path tracing algorithm.

6. The method of claim 1, further comprising:
sending over time, using the processor, the rendered image for lighted patient volume scan data to a visualization device.

7. The method of claim 6, further comprising:
moving over time, using the processor, the target area in relation to a position of the visualization device.

8. The method of claim 1, wherein the target area is an anatomical region within a patient from the patient volume scan data.

9. A system for light map capture, the system comprising:
a processor configured to receive over time patient scan data for a target area;
at least one camera configured to capture lighting environment data over time that intersects an exterior surface on a patient for the target area;
the at least one camera configured to further transmit over time the lighting environment data to the processor;
the processor configured to further receive over time the lighting environment data;
the processor configured to further apply lighting from the lighting environmental data to the patient scan data, resulting in lighted volume data; and
the processor configured to further render images over time from the lighted volume data.

10. The system of claim 9, wherein the at least one camera is affixed to a C-arm.

11. The system of claim 9, wherein the patient scan data includes a plurality of fluoroscopic images.

12. The system of claim 9, wherein the lighting environment data includes all light that intersects with an exterior surface on a patient for the target area from the patient volume scan data.

13. The system of claim 9, wherein render further includes using a Monte-Carlo path tracing algorithm to render the lighted volume data.

14. The system of claim 9, wherein the processor is configured to transmit the rendered lighted volume data to a visualization device.

15. The system of claim 14, wherein the visualization device is a medical workstation, augmented reality glasses, or some combination thereof.

16. A non-transitory computer readable storage medium having stored therein data representing instructions executable by a programmed processor for facilitating light map capture, the storage medium comprising instructions for:
receiving scan data for a target area internal to a patient;
receiving lighting environment data for the target area as projected to an exterior of the patient;
rendering an image of the target area from the scan data, the rendering including a lighting model based on the lighting environment data for the target area as projected to the exterior of the patient; and
displaying the image.

17. The non-transitory computer readable storage medium of claim 16 wherein the scan data from the receiving includes a plurality of fluoroscopic images.

18. The non-transitory computer readable storage medium of claim 16, wherein the lighting environment data includes all light that intersects with the target area as projected to an exterior of the patient.

19. The non-transitory computer readable storage medium of claim 16, wherein rendering includes using a Monte-Carlo path tracing algorithm.

20. The non-transitory computer readable storage medium of claim 19, wherein displaying further includes sending the rendered image to a visualization device.

* * * * *